(12) United States Patent
Rangan et al.

(10) Patent No.: US 10,294,988 B2
(45) Date of Patent: May 21, 2019

(54) PILLOW BLOCK BEARING ASSEMBLY FOR A DRIVETRAIN ASSEMBLY OF A WORK VEHICLE

(71) Applicant: CNH Industrial America, LLC, New Holland, PA (US)

(72) Inventors: Srinivasan Rangan, Willow Brook, IL (US); Michael Volkmer, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/210,272

(22) Filed: Jul. 14, 2016

(65) Prior Publication Data

US 2018/0017102 A1    Jan. 18, 2018

(51) Int. Cl.
| F16C 23/08 | (2006.01) |
| F16C 33/78 | (2006.01) |
| F16C 33/66 | (2006.01) |

(52) U.S. Cl.
CPC ........ *F16C 23/086* (2013.01); *F16C 33/6622* (2013.01); *F16C 33/7836* (2013.01); *F16C 2240/46* (2013.01); *F16C 2326/06* (2013.01)

(58) Field of Classification Search
CPC .... B62D 63/04; F16C 23/086; F16C 33/6622; F16C 33/7836
USPC .......... 280/400; 277/348, 371, 350, 398, 95; 384/497, 477, 481, 482, 140, 142
See application file for complete search history.

(56) References Cited

U.S. PATENT DOCUMENTS

| 2,397,703 A | | 4/1946 | Stallman | |
| 2,441,294 A | * | 5/1948 | Shafer | ................ F16C 33/6607 |
| | | | | 277/361 |
| 2,619,369 A | * | 11/1952 | Williams | .............. F16C 23/086 |
| | | | | 277/505 |

(Continued)

FOREIGN PATENT DOCUMENTS

| EP | 1678427 | 6/2013 |
| GB | 773205 | 4/1957 |
| GB | 996085 | 6/1965 |

OTHER PUBLICATIONS

FAG—Split Plummer Block Housing SNV Schaeffler Group Industrial, Schaeffler Technologies GmbH & Co. KG—Publication, dated Mar. 2010.

*Primary Examiner* — Jacob D Knutson
(74) *Attorney, Agent, or Firm* — Rickard K. DeMille; Rebecca L. Henkel (57) ABSTRACT

A pillow block bearing assembly for a drivetrain assembly of a work vehicle may include a pillow block housing defining a bearing cavity, a bearing disposed within the bearing cavity, and first and second sealing devices installed within the bearing cavity. Additionally, the drivetrain assembly may include a shaft received within the pillow block bearing assembly, with the shaft extending through the bearing such that an outer circumferential surface of the shaft directly contacts an inner circumferential surface of an inner race of the bearing at a bearing/shaft interface defined between the shaft and the bearing. Moreover, a sliding fit may be defined between the outer circumferential surface of the shaft and the inner circumferential surface of the inner race at the bearing/shaft interface such that the shaft is allowed to slide axially relative to the bearing when a given axial load is applied through the shaft.

20 Claims, 6 Drawing Sheets

(56) References Cited

U.S. PATENT DOCUMENTS

| | | | | |
|---|---|---|---|---|
| 2,915,345 | A | * | 12/1959 | Workman ........... F16C 33/7886 |
| | | | | 277/575 |
| 2,983,529 | A | * | 5/1961 | Price .................... F16C 23/084 |
| | | | | 277/346 |
| 3,187,591 | A | | 6/1965 | Johnson |
| 3,325,175 | A | * | 6/1967 | Lower .................... F16C 33/76 |
| | | | | 277/565 |
| 3,588,208 | A | | 6/1971 | Kane |
| 3,989,323 | A | * | 11/1976 | Lambert ................ F16C 33/60 |
| | | | | 384/434 |
| 4,093,324 | A | | 6/1978 | Carrigan |
| 4,249,782 | A | | 2/1981 | Frank |
| 4,348,067 | A | | 9/1982 | Tooley |
| 4,533,264 | A | | 8/1985 | Haugwitz |
| 4,699,528 | A | | 10/1987 | Gotman |
| 4,776,709 | A | * | 10/1988 | Tooley ................. F16C 19/385 |
| | | | | 384/482 |
| 5,045,027 | A | * | 9/1991 | Larsen ..................... F16D 3/66 |
| | | | | 192/207 |
| 5,549,393 | A | | 8/1996 | Morando |
| 8,047,548 | B2 | | 11/2011 | Roddis |
| 8,075,196 | B2 | | 12/2011 | Burner et al. |
| 2007/0222158 | A1 | | 9/2007 | Roddis |
| 2014/0064650 | A1 | | 3/2014 | Siebke et al. |

* cited by examiner

PILLOW BLOCK BEARING ASSEMBLY FOR A DRIVETRAIN ASSEMBLY OF A WORK VEHICLE

FIELD OF THE INVENTION

The present subject matter relates generally to work vehicles and, more particularly, to a pillow block bearing assembly for drivetrain assembly of a work vehicle.

BACKGROUND OF THE INVENTION

Known work vehicles, such as tractors, often include an articulated chassis having a front chassis frame and a separate rear chassis frame, with the chassis frames being coupled to one another at a joint in a manner that allows the orientation of the rear chassis frame to differ from the orientation of the front chassis frame. The front chassis frame is typically supported on the front wheels or tracks of the work vehicle and may be configured to provide support for the engine, transmission, the front axle assembly, and/or the cab of the work vehicle. Similarly, the rear chassis frame may be supported on the rear wheels or tracks of the work vehicle and may be configured to support the rear axle assembly of the work vehicle. To provide a connection along the drivetrain between the front and rear chassis frames, an articulation shaft is typically coupled to the transmission, with the articulation shaft being, in turn, coupled to a rear axle shaft of the work vehicle at a location at or adjacent to the joint defined between the chassis frames. The rear axle shaft is then coupled to the rear axle assembly to allow rotational motion to be transferred to the rear wheels or tracks.

Typically, the rear axle shaft is supported relative to the rear chassis frame via a bearing assembly. In today's market, most bearing assemblies used to support the rear axle shaft of a work vehicle having an articulated chassis are configured to be press-fit onto the rear axle shaft or are otherwise secured to the shaft in a manner that prevents axial movement of the shaft relative to the bearing (e.g., by securing the bearing to the shaft via a set screw). As such, axial loads directed through the shaft during articulation or oscillation of the chassis are transmitted to the bearing, which can lead to a reduced component life for the bearing and/or failure of the bearing. In addition, many conventional bearing assemblies provide inadequate sealing between the shaft and the bearing. As a result, water and abrasive particles may be introduced into the bearing. Such contamination can significantly reduce the component life of the bearing.

Accordingly, an improved pillow block bearing assembly for use within a work vehicle that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a drivetrain assembly for a work vehicle. The drivetrain assembly may generally include a pillow block bearing assembly having a pillow block housing configured to be mounted to a frame of the work vehicle. The pillow block housing may define a bearing cavity. The pillow block bearing assembly may also include a bearing disposed within the bearing cavity. The bearing may include an outer race coupled to the pillow block housing and an inner race rotatable relative to the outer race. The bearing may further include first and second rows of bearing elements positioned between the inner and outer races, with the inner race defining an inner circumferential surface. Additionally, the pillow block bearing assembly may include first and second sealing devices installed within the bearing cavity, with the first sealing device being positioned on a first side of the bearing and the second sealing device being positioned on an opposite, second side of the bearing. Each of the first and second sealing devices may include a sealing ring extending radially inwardly from the pillow block housing and a resilient sealing member extending radially inwardly from the sealing ring. The drivetrain assembly also include a shaft received within the pillow block bearing assembly, with the shaft extending through the bearing such that an outer circumferential surface of the shaft directly contacts the inner circumferential surface of the inner race at a bearing/shaft interface defined between the shaft and the bearing. Moreover, the resilient sealing member of each of the first and second seal assemblies may be configured to contact the outer circumferential surface of the shaft as the shaft rotates relative to the resilient sealing member. In addition, a sliding fit may be defined between the outer circumferential surface of the shaft and the inner circumferential surface of the inner race at the bearing/shaft interface such that the shaft is allowed to slide axially relative to the bearing when a given axial load is applied through the shaft.

In another aspect, the present subject matter is directed to a work vehicle. The work vehicle may generally include an articulated chassis having a front chassis frame and a rear chassis frame, a transmission supported by the front chassis frame, an articulation shaft coupled to the transmission, and a rear axle shaft coupled to the articulation shaft, with the rear axle shaft defining an outer circumferential surface. The work vehicle may also include a pillow block bearing assembly supporting the rear axle shaft relative to the rear chassis frame. The pillow block bearing assembly may generally include a pillow block housing mounted to the rear chassis frame, with the housing defining a bearing cavity. The pillow block bearing assembly may also include a bearing disposed within the bearing cavity. The bearing may include an outer race coupled to the pillow block housing, an inner race rotatable relative to the outer race, and first and second rows of bearing elements positioned between the inner and outer races. The inner race may define an inner circumferential surface. In addition, the rear axle shaft may extend through the bearing such that the outer circumferential surface of the rear axle shaft directly contacts the inner circumferential surface of the inner race at a bearing/shaft interface defined between the rear axle shaft and the bearing. Moreover, the pillow block bearing assembly may include first and second sealing devices installed within the bearing cavity, with the first sealing device being positioned on a first side of the bearing and the second sealing device being positioned on an opposite, second side of the bearing. Each of the first and second sealing devices may include a sealing ring extending radially inwardly from the pillow block housing and a resilient sealing member extending radially inwardly from the sealing ring such that the resilient sealing member slidingly contacts the outer circumferential surface of the shaft. Further, a sliding fit may be defined between the outer circumferential surface of the rear axle shaft and the inner circumferential surface of the inner race at the bearing/shaft interface such that the rear axle shaft is allowed to slide axially relative to the bearing when a given axial load is applied through the rear axle shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pillow block bearing assembly for a work vehicle. Specifically, in several embodiments, the pillow block bearing assembly may be used to support a rear axle shaft relative to a rear chassis frame of an articulated chassis of a work vehicle. As will be described in greater detail below, the pillow block bearing assembly may include a pillow block housing having a self-aligning ball bearing positioned therein that is configured to receive the rear axle shaft. In addition, the assembly may include first and second sealing devices positioned within the pillow block housing along opposed sides of the bearing that are configured to seal against the shaft, thereby allowing the bearing to be completely enclosed with grease or any other suitable lubricant and preventing water, particulates and/or any other contaminates from being introduced into the bearing.

Moreover, in accordance with aspects of the present subject matter, a sliding fit may be defined between the bearing and the rear axle shaft at the bearing/shaft interface defined between the inner race of the bearing and the shaft. As will be described below, the sliding fit defined between the bearing and the rear axle shaft may be selected such that the shaft is maintained in rotational engagement with the inner race while still allowing the shaft to slide axially relative to the bearing. Thus, when a substantial axial load is directed through the rear axle shaft, the shaft may be allowed to slide relative to the bearing, thereby preventing all or a significant portion of the axial load from being transmitted to the bearing.

It should be appreciated that, in addition to enhanced sealing and an improved axial bearing fit, the disclosed pillow block bearing assembly may provide numerous other advantages over conventional bearing assemblies. For instance, the self-aligning ball bearing may provide the assembly with additional axial and radial load carrying capabilities. In addition, by utilizing a pillow block mount type, the disclosed assembly may be easily and securely installed onto the rear chassis frame of a work vehicle or at any other suitable location on or within a work vehicle. Moreover, the various components of the pillow block bearing assembly may be quickly and easily assembled in a manufacturing environment.

Figure 1:
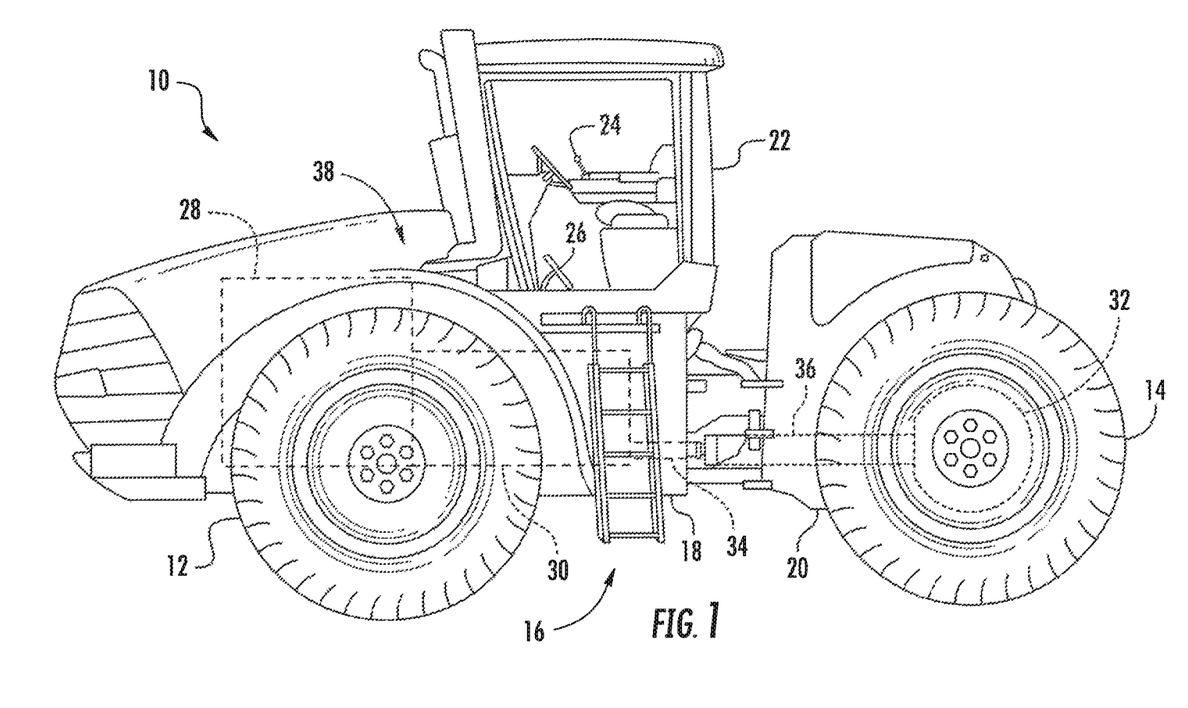
FIG. 1 illustrates a side view of one embodiment of a work vehicle in accordance with aspects of the present subject matter.

Referring now to FIG. 1, a side view of one embodiment of a work vehicle 10 is illustrated in accordance with aspects of the present subject matter. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and an articulated chassis 16 coupled to and supported by the wheels 12, 14. For instance, the articulated chassis 16 may include a front chassis frame 18 coupled to and supported by the front wheels 12 and a rear chassis frame 20 coupled to and supported by the rear wheels 14. Additionally, an operator's cab 22 may be supported by a portion of the chassis 16 (e.g., the front chassis frame 18) and may house various input devices, such as a control lever 24 and/or a foot pedal 26, for permitting an operator to control the operation of the work vehicle 10.

Moreover, the work vehicle 10 may include an engine 28 and a transmission 30 mounted on the chassis 16, such as by mounting the engine 28 and the chassis 30 on the front chassis frame 18. The transmission 30 may be operably coupled to the engine 28 and may provide variably adjusted gear ratios for transferring engine power to the wheels 12, 14 via one or more drive axle assemblies. For instance, the transmission 30 may transfer engine power to both the front wheels 12 via a front axle assembly (not shown) and the rear wheels 14 via a rear axle assembly 32.

As shown in FIG. 1, the transmission 30 may be coupled to the rear axle assembly 32 via an articulation shaft 34 and a rear axle shaft 36. Specifically, the articulation shaft 34 may be coupled at one end to the transmission 30 and at its opposed end to the rear axle shaft 36. Additionally, the rear axle shaft 36 may be coupled directly between the articulation shaft 34 and the rear axle assembly 32. As will be described below, the rear axle shaft 36 may be supported relative to the rear chassis frame 20 via a pillow block bearing assembly 100 (FIGS. 2-6) configured to be mounted to the rear chassis frame 20. In one embodiment, the transmission 30, the front axle assembly, the rear axle assembly 32, the associated shafts 34, 36 and the pillow block bearing assembly 100 may collectively define a drivetrain assembly 38 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. Additionally, although not shown, the work vehicle 10 may also be configured to be operably coupled to any suitable type of work implement, such as a trailer, spray boom, manure tank, feed grinder, plow and/or the like.

Figure 2:
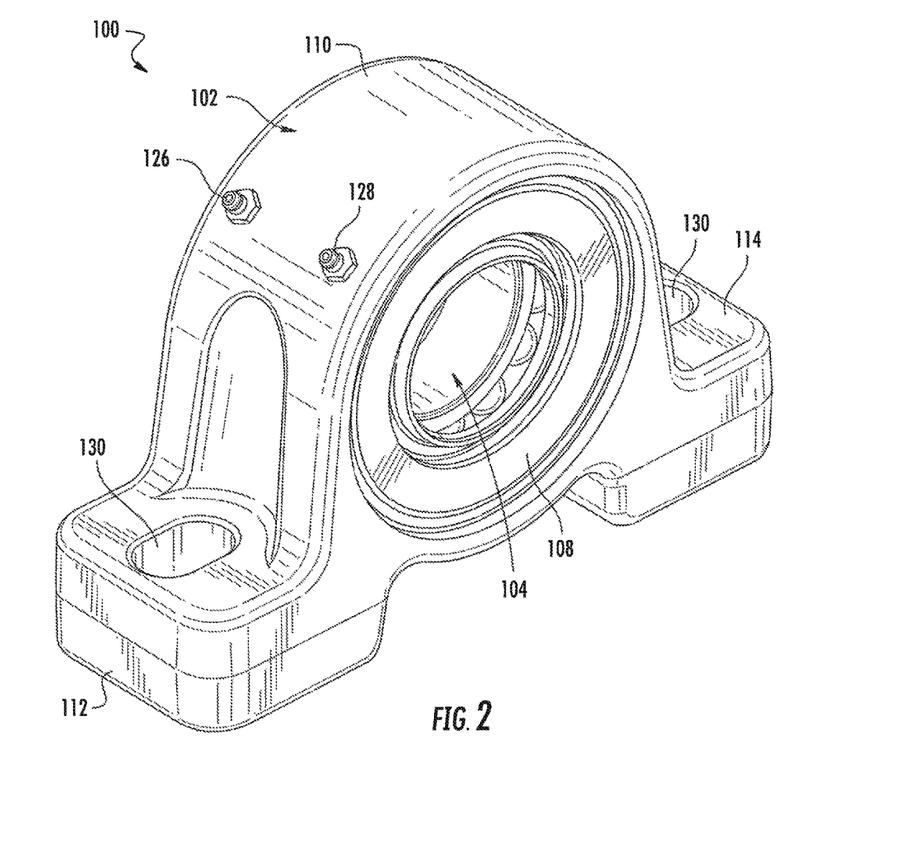
FIG. 2 illustrates a perspective view of one embodiment of a pillow block bearing assembly suitable for use within a work vehicle, such as the work vehicle shown in FIG. 1, in accordance with aspects of the present subject matter.
Figure 3:
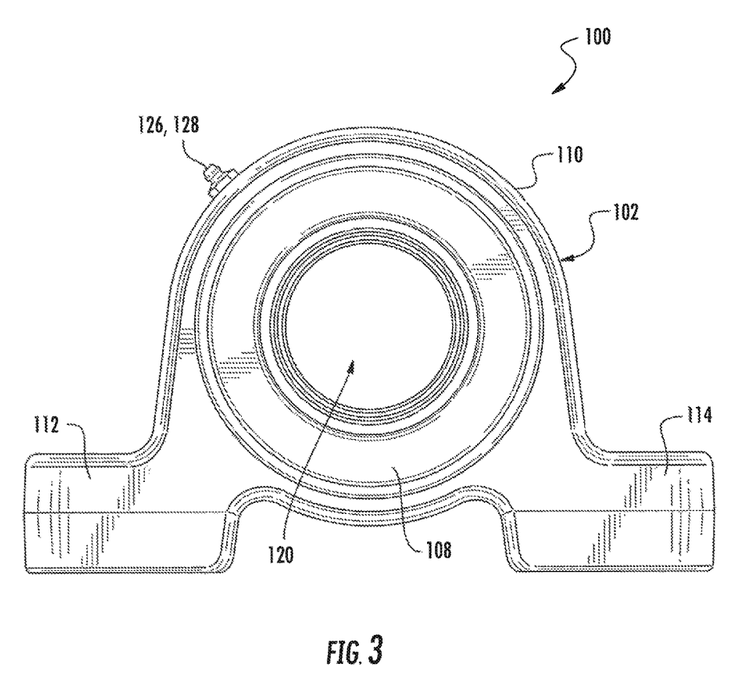
FIG. 3 illustrates a front view of the pillow block bearing assembly shown in FIG. 2.
Figure 4:
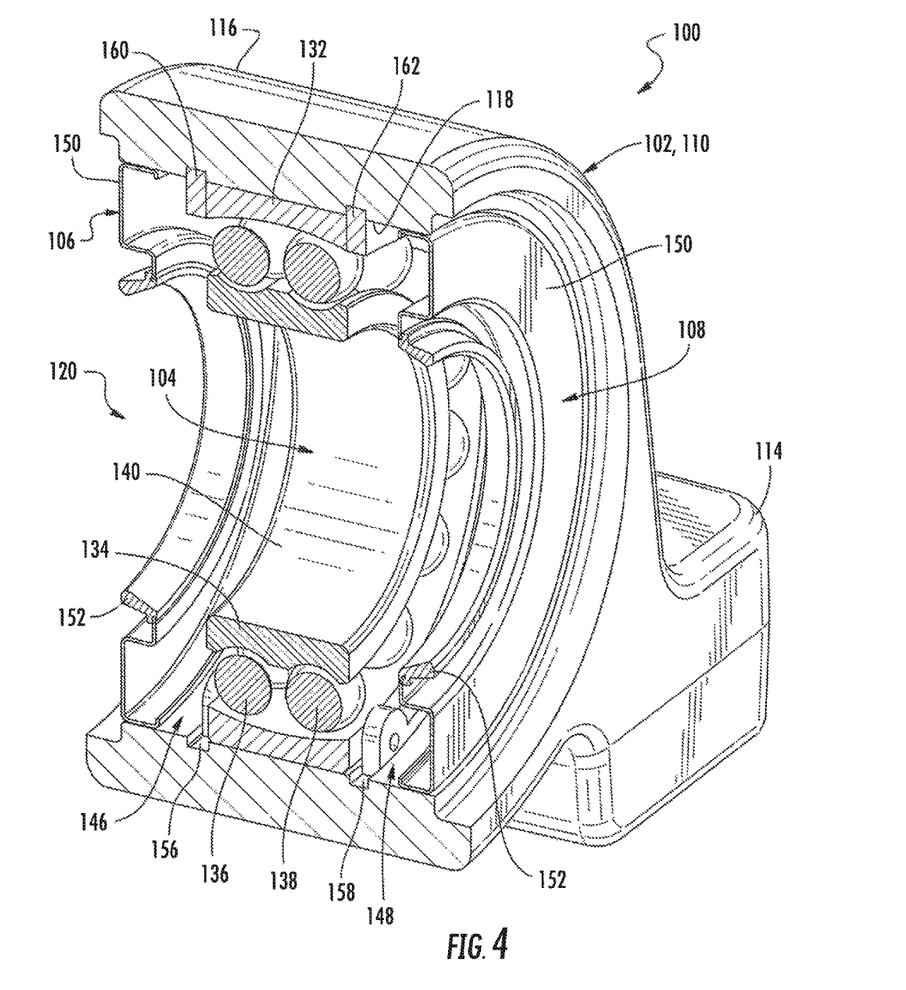
FIG. 4 illustrates a perspective, cross-sectional view of the pillow block bearing assembly shown in FIG. 2.
Figure 5:
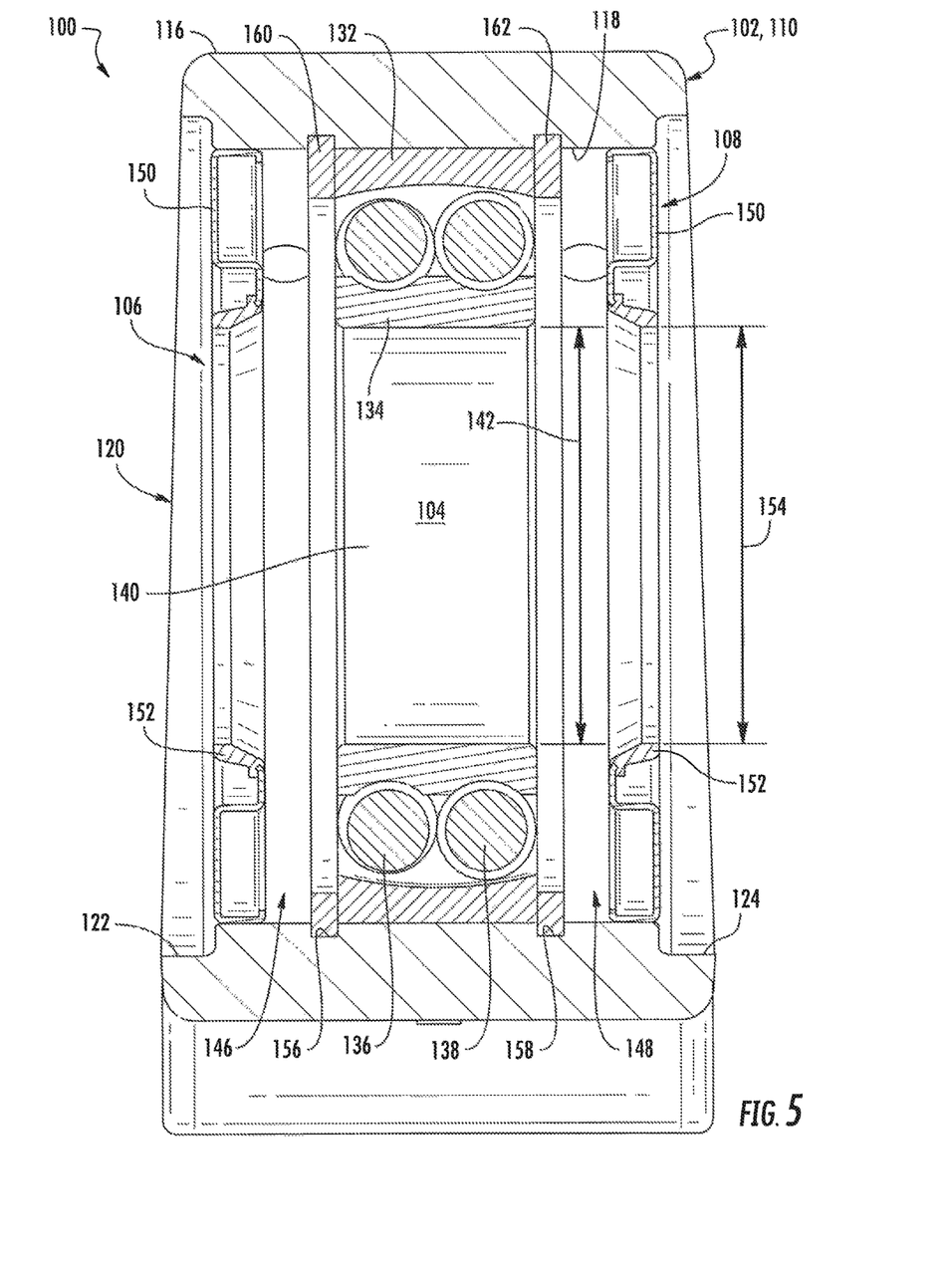
FIG. 5 illustrates a side, cross-sectional view of the pillow block bearing assembly shown in FIG. 4.
Figure 6:
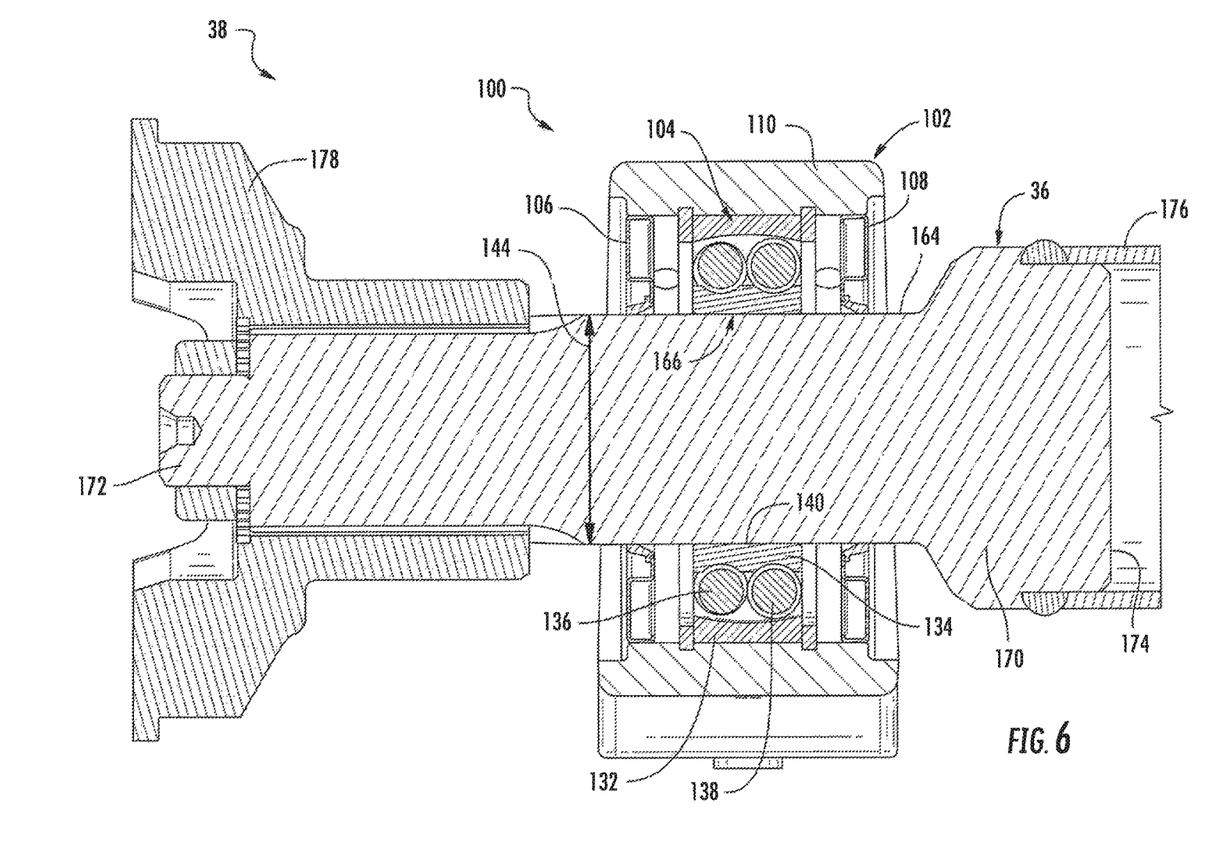
FIG. 6 illustrates the same cross-sectional view of the pillow block bearing assembly shown in FIG. 5, particularly illustrating a shaft of the work vehicle extending through the pillow block bearing assembly in accordance with aspects of the present subject matter.

Referring now to FIGS. 2-6, several views of one embodiment of a pillow block bearing assembly 100 suitable for use with a work vehicle, such as the work vehicle 10 described above with reference to FIG. 1, are illustrated in accordance with aspects of the present subject matter. Specifically, FIG. 2 illustrates a perspective view of the pillow block bearing assembly 100 and FIG. 3 illustrates a front view of the pillow block bearing assembly 100 shown in FIG. 2. FIG. 4 illustrates a perspective, cross-sectional view of the pillow block bearing assembly 100 shown in FIG. 2, particularly providing a partial, internal view of the assembly 100. FIG. 5 illustrates a side, cross-sectional view of the pillow block bearing assembly 100 shown in FIG. 4. Additionally, FIG. 6 illustrates the same cross-sectional view of the pillow block bearing assembly 100 shown in FIG. 5, with a portion of the rear axle shaft 36 being received within the assembly 100.

As shown, the pillow block bearing assembly 100 may generally include a pillow block housing 102, a bearing 104 disposed within the pillow block housing 102, and first and second sealing devices 106, 108 configured to be installed within the pillow block housing 102 relative to opposed sides of the bearing 104. In general, the pillow block housing 102 may include a base housing portion 110 and first and second mounting flanges 112, 114 extending outwardly from the base housing portion 110. As particularly shown in FIGS. 2 and 3, the base housing portion 110 may define a substantially circular shape. Additionally, as shown in FIGS. 4 and 5, the base housing portion 110 may include an outer surface 116 defining the outer perimeter of the base housing portion 110 and an inner surface 118 defining a bearing cavity 120 (FIG. 5) for receiving the bearing 104 and the associated sealing devices 106, 108. For instance, as shown in FIG. 5, the bearing cavity 120 may extend axially between a first end 120 defined by a first outer circumferential recess of the base housing portion 110 and a second end 122 defined by a second outer circumferential recess of the base housing portion 110. Moreover, the base housing portion 110 may also include one or more lubrication ports (e.g., a first lubrication port 126 and a second lubrication port 128) defined between its inner and outer surfaces 118, 116. As will be described below, the lubrication ports 126, 128 may allow a suitable lubricant (e.g., grease) to be injected within the pillow block housing 102.

As shown, the mounting flanges 112, 114 of the pillow block housing 102 may generally be configured to extend outwardly from a lower section of the base housing portion 110 to allow the mounting flanges 112, 114 to vertically support the base housing portion 110 relative to the mounting surface to which the pillow block housing 102 is being coupled. For instance, as indicated above, the disclosed pillow block bearing assembly 100 may be configured to be coupled to and supported by the rear chassis frame 20 (FIG. 1) of the work vehicle 10. In such an embodiment, the mounting flanges 112, 114 may be configured to vertically support the base housing portion 110 relative to the rear chassis frame 20. Additionally, each mounting flange 112, 114 may define an opening 130 configured to receive a suitable mechanical fastener (e.g., bolts) for coupling the pillow block housing 102 to the rear chassis frame 20. As such, when the pillow block housing 102 is installed relative to the rear chassis frame 20, the fasteners (not shown) may be inserted through both the openings 130 and corresponding openings defined in the rear chassis frame 20 to allow the pillow block housing 102 to be mounted to the frame 20.

As particularly shown in FIG. 5, the bearing 104 of the disclosed assembly 100 may be received within the bearing cavity 120 of the pillow block housing 102 such that the bearing 104 is substantially centrally positioned between the first and second ends 122, 124 of the cavity 120. In general, the bearing 104 may include an outer race 132, an inner race 134 configured to rotate relative to the outer race 132, and a plurality of bearing elements 136, 138 (e.g., balls) positioned between the inner and outer races 134, 132. As shown in the illustrated, the outer race 132 may be configured to be non-rotatably coupled to the pillow block housing 102, such as by providing a friction or press fit between the outer race 132 and the inner surface 118 of the base housing portion 110 of the housing 102. Additionally, the inner race 134 may be spaced radially inwardly from the outer race 132 such that the bearing elements 136, 138 are positioned directly between the inner and outer races 134, 132. As shown in FIGS. 4 and 5, the bearing 104 may include two rows of bearing elements, namely a first row of bearing elements 136 and a second row of bearing elements 138. In one embodiment, the bearing 104 may be configured as a self-aligning ball bearing. For instance, unlike the isolated raceways defined by the inner race 134, the outer race 132 of the bearing 104 may define a common spherical raceway for the separate rows of bearing elements 136, 138 to allow the bearing 104 to accommodate angular misalignments of the rear axle shaft 36 relative to the pillow block bearing assembly 100.

Additionally, as shown in FIG. 5, the inner race 134 may include an inner circumferential surface 140 defining an inner diameter 142 of the bearing 104. As will be described in greater detail below, the inner diameter 142 of the inner race 134 may be larger than an outer diameter 144 (FIG. 6) of the portion of the rear axle shaft 36 received within the bearing 104. As such, a sliding fit may be defined at the interface defined between the bearing 104 and the rear axle shaft 36 to allow the shaft 36 to slide axially relative to the bearing 104.

As indicated above, the pillow block bearing assembly 100 may also include first and second sealing devices 106, 108 configured to be installed within the pillow block housing 102. Specifically, as shown in FIG. 5, the first sealing device 106 may be installed within the pillow block housing 102 along a first side of the bearing 104 such that the sealing device 106 is positioned between the bearing 104 and the first end 122 of the bearing cavity 120. Similarly, the second sealing device 108 may be installed within pillow block housing 102 along a second side of the bearing 104 such that the sealing device 108 is positioned between the bearing 104 and the second end 124 of the bearing cavity 120.

Additionally, in one embodiment, the sealing devices 106, 108 may be spaced apart axially from the bearing 104 along both of its sides such that lubrication chambers 146, 148 are defined between the bearing 104 and each sealing device 106, 108. For instance, as shown in FIG. 5, a first lubrication chamber 146 may be defined between the first sealing device 106 and the bearing 104 and a second lubrication chamber 148 may be defined between the second sealing device 108 and the bearing 104. In such an embodiment, the first and second lubrication ports 126, 128 defined by the pillow block housing 102 may be provided in fluid communication with the first and second lubrication chambers 146, 148, respectively, thereby allowing a suitable lubricant (e.g., grease) to be injected into the pillow block housing 102 in order to fill or substantially fill each lubrication chamber 146, 148 with the lubricant.

As particularly shown in FIGS. 4 and 5, each sealing device 106, 108 may include a sealing ring 150 extending radially inwardly from the inner surface 118 of the base housing portion 110 of the pillow block housing 102 and a resilient sealing member 152 extending radially inwardly from the sealing ring 150. In general, each sealing ring 150 may be formed from a rigid or substantially rigid material, such as a metal material, and may be configured to extend inwardly from the pillow block housing 102 a sufficient radial distance so as to position the corresponding resilient sealing member 152 adjacent to the portion of the shaft 36 extending through the disclosed assembly 100. As shown in FIG. 5, in one embodiment, each sealing ring 150 may define a partial, serpentine-like shape such that, when combined with the sealing member 152, each sealing device 106, 108 may has an "S-shaped" cross-section.

Additionally, in several embodiments, each sealing member 152 may be formed from any suitable resilient material, such as an elastomeric material, that allows the sealing members 152 to contact the portion of the shaft 36 extending through the disclosed assembly 100 to create a sealed interface between each sealing device 106, 108 and the shaft 36, thereby preventing water, particulates and other contaminates from entering the axial space defined between the sealing devices 106, 108 and also maintaining the lubricant within the lubrication chambers 146, 148. As shown in FIG. 5, each sealing device 106, 108 may have an inner diameter 154 defined by the radially inner end of each sealing member 152. In one embodiment, the inner diameter 154 of each sealing device 106, 108 may be smaller than the outer diameter 144 (FIG. 6) of the shaft 36. In such an embodiment, the sealing members 152 may be compressed against the outer perimeter of the shaft 36 to create a sealed interface between each sealing device 106, 108 and the shaft 36. For instance, as the shaft 36 is rotated relative to the sealing devices 106, 108, the sealing members 152 may be configured to slidingly contact the outer surface of the shaft 36 at the sealed interface.

Moreover, the pillow block housing 102 may also define inner circumferential recesses 156, 158 configured to receive axial stop rings 160, 162 (e.g., snap rings) for preventing axial motion of the bearing 104 relative to the housing 102. For instance, as shown in FIGS. 4 and 5, first and second inner circumferential recesses 156, 158 may defined around the inner perimeter of the base housing portion 110, with the first circumferential recess 156 being located adjacent to the first side of the bearing 104 and the second inner circumferential recess 158 being located adjacent to the opposed, second side of the bearing 104. Each inner circumferential recess 156, 158 may be configured to receive a corresponding axial stop ring 160, 162. As shown in FIG. 5, the axial stop rings 160, 162 may extend radially inwardly from the pillow block housing 102 such that each stop ring 160, 162 is configured to axially engage the outer race 132 along each side of the bearing 104, thereby allowing the stop rings 160, 162 to serve as a mechanical stop that prevents axial movement of the bearing 104 relative to the housing 102.

Referring particularly now to FIG. 6, as indicated above, a portion of the rear axial shaft 36 may be configured to extend through or otherwise be received within the disclosed pillow block bearing assembly 100. In several embodiments, the shaft 136 may be configured to directly engage or otherwise contact the inner race 134 of the bearing 104. For instance, as shown in FIG. 6, the shaft 36 may define an outer circumferential surface 164 configured to directly contact the inner circumferential surface 140 of the inner race 134 at a bearing/shaft interface 166 defined between the shaft 36 and the bearing 104. As such, the shaft 36 may rotationally engage the inner race 134 at the bearing/shaft interface 166, thereby allowing the inner race 134 to rotate relative to the outer race 132 with rotation of the rear axle shaft 36.

Additionally, as shown in FIG. 6, the portion of the rear axle shaft 36 extending through the hearing 104 may define an outer diameter 144. In accordance with aspects of the present subject matter, the outer diameter 144 of the shaft 136 may be smaller than the inner diameter 142 of the inner race 134 such that a negative differential exists between the outer diameter 144 and the inner diameter 142 (i.e., a negative number is produced when the inner diameter 142 of the inner race 134 is subtracted from the outer diameter 144 of the shaft 136). In several embodiments, the negative diameter differential defined between the shaft 36 and the inner race 134 may be selected such that a sliding fit is defined between the outer circumferential surface 164 of the shaft 36 and the inner circumferential surface 140 of the inner race 134 at the bearing/shaft interface 166, thereby allowing the shaft 36 to slide axially relative to the bearing 104 when a given axial load is applied through the shaft 36. For instance, in one embodiment, the negative differential between the outer diameter 144 of the shaft 36 and the inner diameter 142 of the inner race 134 may range from less than zero millimeters (mm) to about −0.155 mm, such as from about −0.005 mm to about −0.125 mm or from about −0.050 mm to about −0.100 mm or from about −0.075 mm to about −0.085 mm and/or any other sub-ranges therebetween.

Moreover, as indicated above, in one embodiment, the inner diameter 154 of the sealing devices 106, 108 may be smaller than the outer diameter 144 of the shaft 36. As such, the resilient sealing member 152 of each sealing device 106, 108 may be configured to contact or otherwise press against the outer circumferential surface 164 of the shaft 36 to provide a sealed interface between the sealing devices 106, 108 and the shaft 36. Thus, as the shaft 36 is rotated relative to the sealing devices 106, 108 (and, potentially, slides axially relative to the sealing devices 106, 108), the sealing members 152 may maintain sliding contact with the outer circumferential surface 164 of the shaft 36 to ensure proper sealing between the shaft 36 and the sealing devices 106, 108.

It should be appreciated that the rear axle shaft 36 may correspond to a single shaft component or may include an assembly of shaft components. For instance, as shown in FIG. 6, the rear axle shaft 36 includes a first shaft portion 170 extending through the pillow block bearing assembly 100 between first and second ends 172, 174 and a second shaft portion 176 extending rearward from the first shaft portion 170. In one embodiment, the first shaft portion 170 of the rear axle shaft 46 may be configured to be coupled between the articulation shaft 34 (FIG. 1) of the work vehicle 10 and the second shaft portion 176. For instance, as shown in FIG. 6, the rear axle shaft 36 may include a shaft hub 178 disposed at the first end 172 of the first shaft portion 170 that is configured to be coupled to a corresponding hub component (not shown) of the articulation shaft 34. Additionally, as shown in FIG. 6, the second end 174 of the first shaft portion 170 is configured to be coupled to the second shaft portion 176 of the rear axle shaft 36. The second shaft portion 176 may, in turn, extend between the first shaft portion 170 and the rear axle assembly 32 (FIG. 1) of the work vehicle 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drivetrain assembly for a work vehicle, the drivetrain assembly comprising:
   a pillow block bearing assembly comprising:
      a pillow block housing configured to be mounted to a frame of the work vehicle, the pillow block housing defining a bearing cavity;
      a bearing disposed within the bearing cavity, the bearing including an outer race coupled to the pillow block housing and an inner race rotatable relative to the outer race, the bearing further including first and second rows of bearing elements positioned between the inner and outer races, the inner race defining an inner circumferential surface; and
      first and second sealing devices installed within the bearing cavity, the first sealing device being positioned on a first side of the bearing and the second sealing device being positioned on an opposite, second side of the bearing, each of the first and second sealing devices including a sealing ring extending radially inwardly from the pillow block housing and a resilient sealing member extending radially inwardly from the sealing ring; and
   a shaft received within the pillow block bearing assembly, the shaft extending through the bearing such that an outer circumferential surface of the shaft directly contacts the inner circumferential surface of the inner race at a bearing/shaft interface defined between the shaft and the bearing,
   wherein the resilient sealing member of each of the first and second seal assemblies is configured to directly contact the outer circumferential surface of the shaft as the shaft rotates relative to the resilient sealing member, and
   wherein a sliding fit is defined between the outer circumferential surface of the shaft and the inner circumferential surface of the inner race at the bearing/shaft interface such that the shaft is allowed to slide axially relative to the bearing when a given axial load is applied through the shaft.

2. The drivetrain assembly of claim 1, wherein the shaft defines an outer diameter and the inner race defines an inner diameter, the outer diameter of the shaft being smaller than the inner diameter of the inner race such that a negative differential exists between the outer diameter and the inner diameter.

3. The drivetrain assembly of claim 2, wherein the negative differential ranges from less than zero mm to about −0.155 mm.

4. The drivetrain assembly of claim 3, wherein the negative differential ranges from about −0.075 mm to about −0.085 mm.

5. The drivetrain assembly of claim 1, wherein the pillow block housing includes a substantially circular-shaped base housing portion and first and second mounting flanges extending outwardly from the base housing portion, the first and second mounting flanges configured to be coupled to the frame of the work vehicle.

6. The drivetrain assembly of claim 1, wherein the first sealing device is spaced apart axially from the bearing such that a first lubrication chamber is defined between the first sealing device and the bearing, and wherein the second sealing device is spaced apart axially from the bearing such that a second lubrication chamber is defined between the second sealing device and the bearing.

7. The drivetrain assembly of claim 6, wherein the pillow block housing defines at least one lubrication port in fluid communication with the first and second lubrication chambers.

8. The drivetrain assembly of claim 1, wherein the housing defines a first circumferential recess along a perimeter of the bearing cavity adjacent to the first side of the bearing and a second circumferential recess along the perimeter of the bearing cavity adjacent to the second side of the bearing.

9. The drivetrain assembly of claim 8, wherein first and second axial stop rings are received within the first and second circumferential recesses, respectively, the first and second axial stop rings being configured to engage the outer race of the bearing to prevent axial movement of the bearing relative to the pillow block housing.

10. The drivetrain assembly of claim 1, wherein the bearing is a self-aligning ball bearing.

11. A work vehicle, comprising:
   an articulated chassis including a front chassis frame and a rear chassis frame;
   a transmission supported by the front chassis frame;
   an articulation shaft coupled to the transmission;
   a rear axle shaft coupled to the articulation shaft, the rear axle shaft defining an outer circumferential surface; and
   a pillow block bearing assembly supporting the rear axle shaft relative to the rear chassis frame, the pillow block bearing assembly comprising:
      a pillow block housing mourned to the rear chassis frame, the pillow block housing defining a bearing cavity;
      a bearing disposed within the bearing cavity, the bearing including an outer race coupled to the pillow block housing and an inner race rotatable relative to the outer race, the bearing further including first and second rows of bearing elements positioned between the inner and outer races, the inner race defining an inner circumferential surface, the rear axle shaft extending through the bearing such that the outer circumferential surface of the rear axle shaft directly contacts the inner circumferential surface of the inner race at a bearing/shaft interface defined between the rear axle shaft and the bearing; and
      first and second sealing devices installed within the bearing cavity, the first sealing device being positioned on a first side of the bearing and the second sealing device being positioned on an opposite, second side of the bearing, each of the first and second sealing devices including a sealing ring extending radially inwardly from the pillow block housing and a resilient sealing member extending radially inwardly from the sealing ring such that the resilient sealing member directly slidingly contacts the outer circumferential surface of the shaft, wherein a sliding fit is defined between the outer circumferential surface of the rear axle shaft and the inner circumferential surface of the inner race at the bearing/shaft interface such that the rear axle shaft is allowed to slide axially relative to the bearing when a given axial load is applied through the rear axle shaft.

12. The work vehicle of claim 11, wherein the rear axle shaft defines an outer diameter and the inner race defines an inner diameter, the outer diameter of the rear axle shaft being smaller than the inner diameter of the inner race such that a negative differential exists between the outer diameter and the inner diameter.

13. The work vehicle of claim 12, wherein the negative differential ranges from less than zero mm to about −0.155 mm.

14. The work vehicle of claim 13, wherein the negative differential ranges from about −0.075 mm to about −0.085 mm.

15. The work vehicle of claim 11, wherein the pillow block housing includes a substantially circular-shaped base housing portion and first and second mounting flanges extending outwardly from the base housing portion, the first and second mounting flanges configured to be coupled to the rear chassis frame.

16. The work vehicle of claim 11, wherein the first sealing device is spaced apart axially from the bearing such that a first lubrication chamber is defined between the first sealing device and the bearing, and wherein the second sealing device is spaced apart axially from the bearing such that a second lubrication chamber is defined between the second sealing device and the bearing.

17. The work vehicle of claim 16, wherein the pillow block housing defines at least one lubrication port in fluid communication with the first and second lubrication chambers.

18. The work vehicle of claim 11, wherein the housing defines a first circumferential recess along a perimeter of the bearing cavity adjacent to the first side of the bearing and a second circumferential recess along the perimeter of the bearing cavity adjacent to the second side of the bearing.

19. The work vehicle of claim 18, wherein first and second axial stop rings are received within the first and second circumferential recesses, respectively, the first and second axial stop rings being configured to engage the outer race of the bearing to prevent axial movement of the bearing relative to the pillow block housing.

20. The work vehicle of claim 11, wherein the bearing is a self-aligning ball bearing.

* * * * *